J. C. R. SCHLEDER.
BICYCLE.
APPLICATION FILED MAR. 4, 1920.
1,380,082.
Patented May 31, 1921.
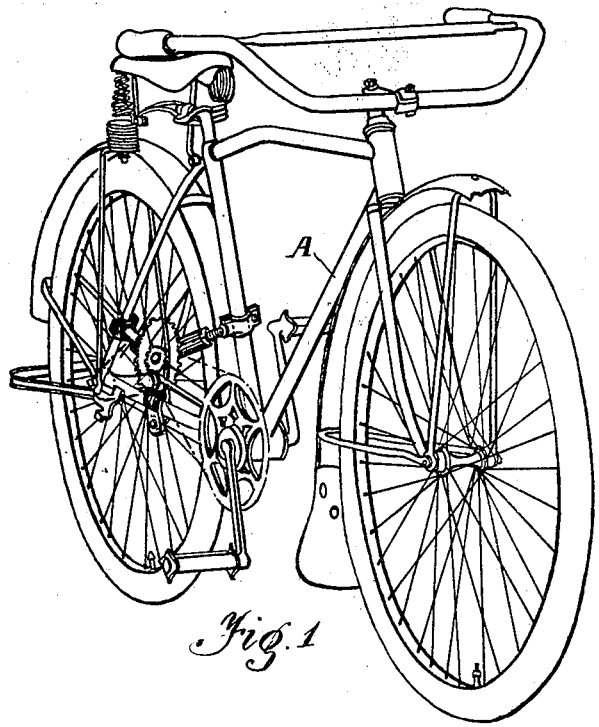
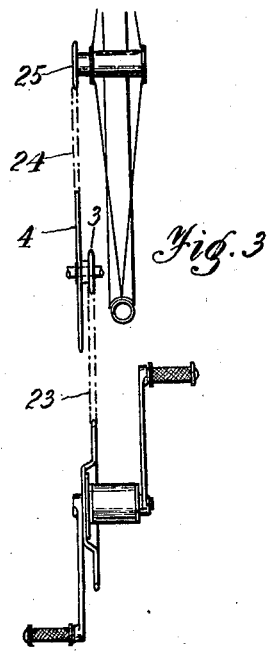
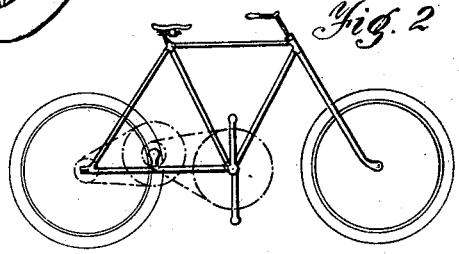
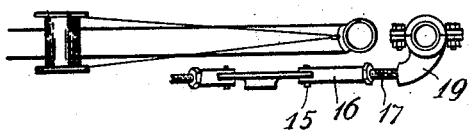
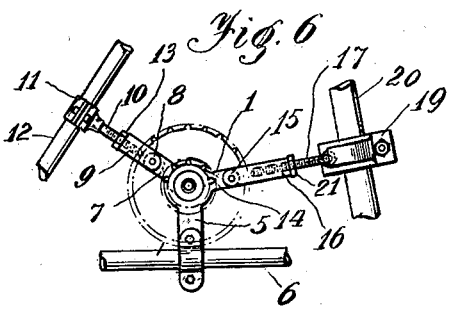
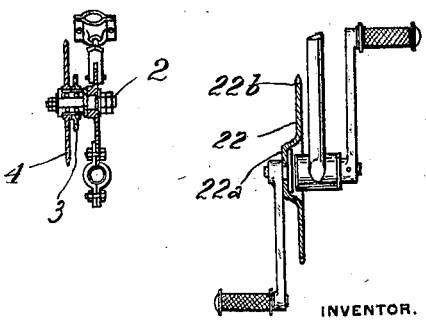
INVENTOR.
John C. R. Schleder
By Ralph Donath
Attorney

UNITED STATES PATENT OFFICE.

JOHN C. R. SCHLEDER, OF McKEES ROCKS, PENNSYLVANIA.

BICYCLE.

1,380,082.

Specification of Letters Patent.

Patented May 31, 1921.

Application filed March 4, 1920. Serial No. 363,243.

*To all whom it may concern:*

Be it known that I, JOHN C. R. SCHLEDER, a citizen of the United States, residing at McKees Rocks, in the county of Allegheny and State of Pennsylvania, have invented certain new and useful Improvements in Bicycles, of which the following is a specification.

This invention relates to bicycles, and more particularly to a device for varying the gear of a bicycle of standard construction.

One of the main objects of the invention is to provide an attachment of simple construction and operation which may be readily applied. A further object is to provide an attachment which may be applied without necessitating material changes in the construction of standard stock bicycles. Further objects will appear from the detailed description.

In the drawings:—

Figure 1 is a perspective side view of bicycle of standard type with an attachment constructed in accordance with my invention applied.

Fig. 2 is a side view showing the device when applied as a permanent part of a specially built bicycle.

Fig. 3 is a diagram illustrating the application of the device.

Fig. 4 is a detail of the main drive sprocket and associated parts.

Fig. 5 is a sectional view through the device.

Fig. 6 is a side view of the device and associated parts.

Fig. 7 is a detail of the means for attaching the device to the seat post of the bicycle.

The attachment includes a three armed bracket 1 which supports a stub shaft 2 secured therein, on which is rotatably mounted a double sprocket consisting of an inner sprocket 3 and an outer sprocket 4 of greater diameter than the inner sprocket.

In applying the attachment, one arm 5 of the bracket is rigidly clamped to one bar 6 of the reach of the bicycle frame A which is of standard construction. Arm 7 of the bracket is pivoted at 8 to a link 9 having a bore which receives a screw 10 the outer end of which is adjustably secured by a clamp 11 to bar 12 of the seat post brace frame. An adjusting nut 13 is threaded upon the screw 10 and bears against the outer end of link 9. Arm 14 of the bracket is pivoted at 15 to the inner end of a link 16 which receives a screw 17 adjustably secured by a clamp 19 to seat post 20, this screw receiving an adjusting nut 21 threaded thereon. As will be noted more clearly from Fig. 7, the link 16 and clamp 19 are so shaped and related as to insure proper alinement of the screw 17 with the link while preventing interference by the link or associated parts with the rear wheel of the bicycle. When the attachment is applied, the usual drive sprocket of the bicycle is replaced by a sprocket 22 the central portion $22^a$ of which is dished outwardly so as to bring the sprocket ring $22^b$ into alinement with sprocket 3. After this has been done, a sprocket chain 23 is passed about the main drive sprocket 22 and sprocket 3, while another sprocket chain 24 is passed about sprocket 25 and sprocket 4, a similar chain 24 being passed about sprocket 4 and sprocket 25 secured to the rear wheel of the bicycle in the known manner. By this means the effective ratio between the sprockets 22 and 25 may be greatly increased so that a low gear bicycle may be readily connected into a high gear one. As will be understood, by varying the relation between sprockets 3 and 4, the gear of a bicycle may be increased or reduced, as desired. The bracket may be readily applied in the manner described and, by means of screws 10 and 17 and the members associated therewith, may be adjusted in either direction along bar 6 so as to obtain proper alinement of the sprockets and take up slack in the sprocket chains.

As will be understood, it may be found by experience desirable to resort to slight changes in details of construction and arrangement of parts of the invention without departing from the field and scope of the same, and I intend to include all such variations as fall within the scope of the appended claims, in this application in which a preferred form only of my invention is disclosed.

What I claim is:

1. In combination with a bicycle of the chain type, a bracket of substantially Y shape; two supplemental sprockets rotatably mounted thereon, means for securing said bracket to the frame of said bicycle and means for establishing driving connections between said sprockets and the driving and driven sprockets of said bicycle.

2. In combination with a bicycle of the chain type, a bracket of substantially Y shape; two supplemental sprockets rotatably mounted thereon; means for adjustably securing said bracket to the frame of said bicycle, and means for establishing driving connections between said sprockets and the driving and driven sprockets of said bicycle.

3. In combination with a bicycle of the chain type, a bracket of substantially Y shape; two supplemental sprockets rotatably mounted thereon; links hingedly connected to the upper arms of said bracket; means for adjustably securing said links and the lower arm of said bracket to the frame of said bicycle; and means for establishing driving connections between said sprockets and the driving and driven sprockets of said bicycle.

4. In combination with a bicycle of the chain type, a bracket of substantially Y shape, two supplemental sprockets rotatably mounted thereon; links hingedly connected to the upper arms of said bracket; the outer end of said links being tapped to receive the threaded shanks of the means for securing said links to the inclined frame members of said bicycle; means for securing the lower arm of said bracket to the frame of said bicycle, and means for establishing driving connections between said sprockets and the driving and driven sprockets of said bicycle.

In testimony whereof I affix my signature.

JOHN C. R. SCHLEDER.